Oct. 1, 1957                    F. W. SEYBOLD                    2,807,967
                              AUTOMATIC TRANSMISSION
Original Filed June 9, 1953                              2 Sheets-Sheet 1

INVENTOR.
Frederick W. Seybold

United States Patent Office 2,807,967
Patented Oct. 1, 1957

2,807,967

AUTOMATIC TRANSMISSION

Frederick W. Seybold, Scotch Plains, N. J.

Original application June 9, 1953, Serial No. 360,519, now Patent No. 2,768,537, dated October 30, 1956. Divided and this application August 2, 1956, Serial No. 601,754

15 Claims. (Cl. 74—677)

This application is a division of my copending application, Serial No. 360,519, filed June 9, 1953, now No. 2,768,537, patented October 30, 1956.

This invention relates to automatic transmissions, particularly adapted for use with internal combustion engines and other applications requiring variable torque and speed ratios.

A primary object of the present invention is to provide an automatic variable torque and speed transmission which is inherently capable to pass from a relatively high torque multiplication ratio smoothly and without intermediate steps into the direct ratio drive without benefit of auxiliary control elements, such as friction clutches or brakes which are usually applied or released to advance the transmission from low gear into high gear.

Another object of this invention is to provide a torque and speed controlled transmission which can automatically adapt itself to the required torque ratio.

A still further object of the invention is to provide a transmission which combines the flexibility of a multiple turbine fluid torque converter with a novel arrangement of two interconnected planetary gear sets to achieve a relatively high initial torque multiplication for starting and which is capable to effect the transition into direct ratio drive without the presence of feed-back torque, at which time the converter will operate as a highly efficient fluid coupling and the output shaft will attain a high mechanical efficiency.

Another object of this invention is to incorporate in the transmission simple means for securing an emergency low gear ratio, reversibility, rocking the vehicle in mud and snow and a device to prevent its backward rolling when the transmission is conditioned for forward operation.

This invention includes other novel features of construction which make this transmission eminently practical and superior in operation. Minor changes and rearrangements will of course, be obvious to those skilled in the art, and such minor changes that can be made in the embodiment of the invention are to be understood to come within the scope of the claims.

The objects stated above with their advantages will become apparent upon reference to the following description taken in connection with the accompanying drawings, in which.

GENERAL ARRANGEMENT

Figure 1:
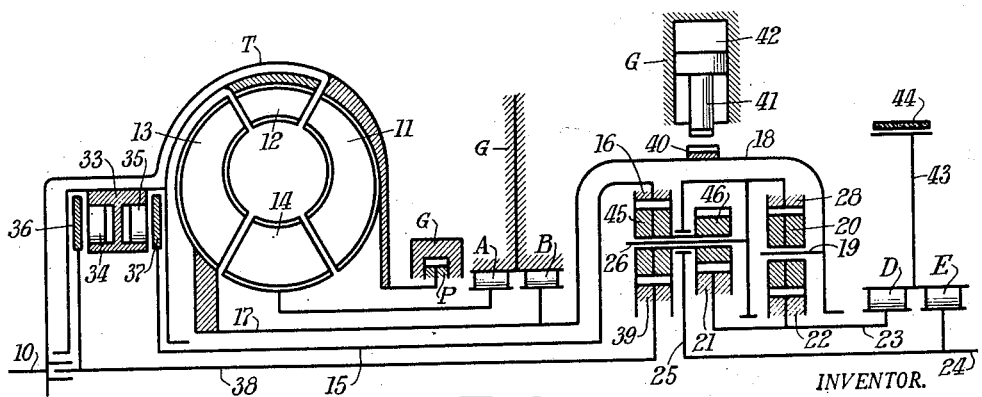
Figure 1 is a vertical, longitudinal section through a power transmission constructed to include additional means to procure reversibility and an emergency low drive ratio.
Figure 2:
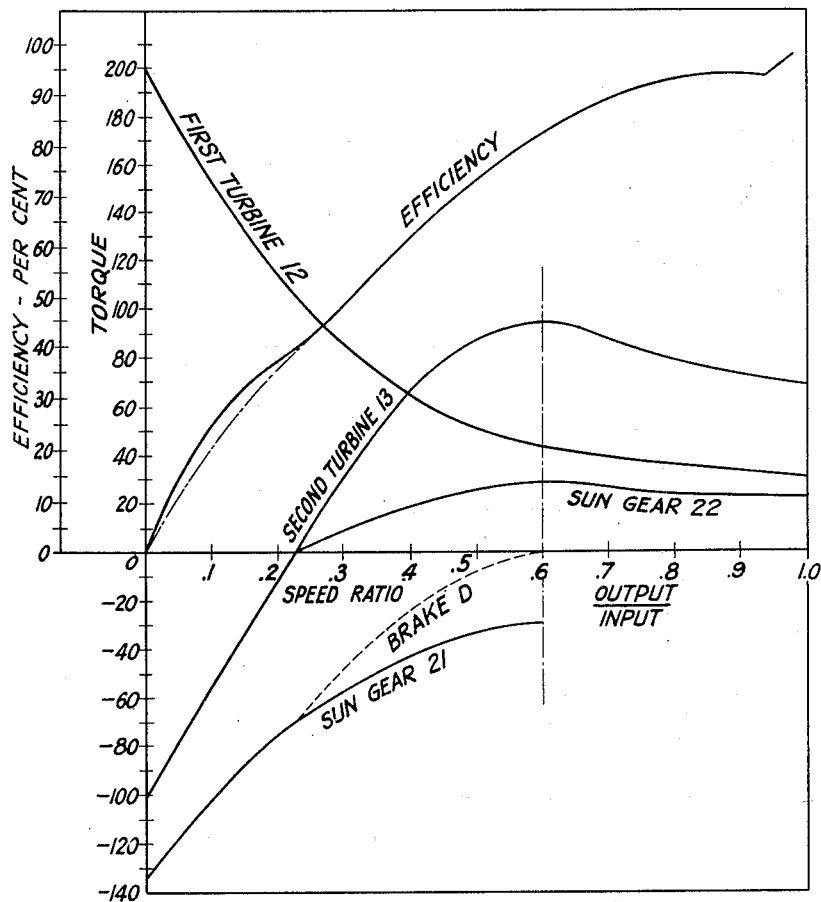
Figure 2 shows graphically the torques imposed on the components of the transmission and its efficiency at various speed ratios.

In general this invention comprises in its simplest form a four-element hydraulic torque converter, novel interconnected planetary gearing controlled by one-way clutches and brakes to impart relatively high starting torque to the output shaft when the turbines of the torque converter are stalled, and as the turbines accelerate, the output shaft speed and torque approach that of the input shaft without benefit of a feed-back torque through the converter or the actuation of control elements to bring about a substantially direct ratio drive, at which time the converter will operate as a highly efficient fluid coupling.

In a further refined form of this invention an emergency low speed ratio is provided in the transmission by making one of the one-way brakes releasable and by the provision of an auxiliary gear set, fluid pressure actuated clutches and a fluid pressure actuated pawl and brake arrangement for arresting the forward rotation of one of the turbines a reverse ratio drive is achieved.

The converter is composed of a pump driven by the prime mover and said pump discharges oil into a first turbine which is connected to one element of a first planetary gear set. The first turbine discharges the oil into the adjacent second turbine which is connected to an element of a second planetary gear set.

A stator or guide wheel serves as a reaction member of the converter and a one-way brake prevents reverse rotation of the stator, but allows its forward rotation when it is relieved of reverse torque.

The third members of said two planetary gear sets are connected and serve as the reaction members of the transmission and by means of one-way brakes are prevented from reverse rotation, while they accommodate forward rotation of said reaction members when reverse torque has vanished.

A one-way brake also cooperates with the second turbine and prevents its reverse rotation when the discharge of oil from the first turbine is so directed against the blades of the second turbine to induce reverse rotation of the latter element.

Finally, another one-way brake between the output member and the transmission casing prevents reverse rotation of the output member and, optionally, said one-way brake may cooperate with those on the above mentioned reaction members, this is a highly desirable feature when the vehicle is stopped on an incline and it is to be put into forward motion without initial backward rolling.

STRUCTURAL ARRANGEMENT

The transmission designed in accordance with the described general arrangement of this invention can best be understood by dividing the transmission into six assemblies for the purpose of describing it in detail.

The six assemblies are listed here as follows:

1. The driving assembly
2. The first turbine assembly
3. The second turbine assembly
4. The reaction assembly
5. The driven assembly
6. The no-roll-back assembly

DESCRIPTION OF FIGURE 1

1. *The driving assembly*

The driving assembly comprises the drive shaft 10 which is connected to the pump element 11 of the hydrokinetic torque converter T, which is composed of four elements. The pump 11 discharges oil into the first turbine element 12, the latter discharges the oil into the second turbine element 13, which in turn discharges the fluid into the stator 14.

An overrunning brake A prevents rotation of the stator 14 in a direction opposite to that of the drive shaft 10, while rotation in the same direction is accommodated by the brake A.

One gear of a gear pump P is also connected to and driven by the element 11 and this pump serves to supply pressure oil to the converter, as well as to other transmission control elements.

2. The first turbine assembly

The first turbine assembly comprises the turbine element 12 which is provided with a duplex cylinder 33 in which ring pistons 34 and 35 are installed for the actuation or selective coupling of the clutch plates 36 and 37 to the first turbine element 12.

Clutch plate 36 is mounted on one end of the long shaft 38, on the other end of which is secured the sun pinion 39. Clutch plate 37 is mounted on the long, hollow shaft 15, to the other end of which is fastened the internal gear 16.

3. The second turbine assembly

The second turbine assembly comprises the turbine element 13 which is connected to the hollow shaft 17. The latter is secured to the casing or carrier 18 in which several studs 19 are supported to serve as journals for the planetary pinions 20. An overrunning brake B prevents reverse rotation of the second turbine element. The inner member of brake B is secured to the shaft 17, while the outer member of brake B is fastened to the transmission casing G.

An externally toothed gear 40 is secured to the casing 18. A hydraulic pressure actuated pawl 41 is reciprocatably mounted in a cylinder 42 provided for in the transmission casing G. When the pawl 41 is engaged with the teeth of gear 40 the rotation of casing 18 in either direction is prevented.

4. The reaction assembly

The reaction assembly consists of the sun gear 21 integral with the sun gear 22 of the second planetary gear set. The inner member of an overrunning brake D is secured to the hub 23 of the pinions 21—22, while the outer member is fastened to the movable brake drum 43. A stationary brake band 44 may be applied to the brake drum 43 and when so applied prevents reverse rotation of pinions 21—22, while the brake D accommodates their forward rotation without releasing the brake band 44.

5. The driven assembly

The driven assembly comprises the output shaft 24 which is connected to the carrier 25 in which the short shafts 26 are secured and on them the compound planetary pinions 45 and 46 are journalled. An internal gear 28 is attached to the carrier 25 and gear 28 meshes with the planetary pinions 20 of the second turbine assembly.

The planetary pinions 45 mesh with the internal gear 16 and the sun pinion 39, while the planetary pinions 46 mesh with the reaction sun gear 21.

6. The no-roll-back assembly

In this design the inner member of the overrunning brake E is secured to the output shaft 24 and the outer member thereof is fastened in the hub of the brake drum 43, and as long as the brake band 44 is applied to the brake drum 43 reverse rotation of the output shaft 24 will be prevented while its forward rotation remains feasible.

OPERATION—FIGURE 3

A. Emergency low operation

To operate this transmission in emergency low the control lever (not shown) is shifted into the position whereby rotation of carrier 18 is prevented by the engagement of the hydraulic pressure actuated pawl 41 with the teeth 40 on the carrier 18. At the same time clutch plate 37 will be locked to the first turbine element 12, while the brake band 44 will be released from the brake drum 43.

With the acceleration of the engine the first turbine 12 will be driven by the high velocity oil flow and its torque will be augmented by the now stationary second turbine 13 serving as a reaction member. The combined sun gears 21 and 22 now rotate in a reverse direction.

For the purpose of illustrating the design of Figure 1 the following gear proportions have been selected:

FIRST GEAR SET

| | Teeth |
|---|---|
| Sun gear 39 | 42 |
| Planet pinions 45 | 15 |
| Internal gear 16 | 72 |
| Planet pinions 46 | 12 |
| Sun gear 21 | 45 |

SECOND GEAR SET

| | Teeth |
|---|---|
| Sun gear 22 | 27 |
| Planet pinions 20 | 18 |
| Internal gear 28 | 63 |

For one revolution of the internal gear 16 the output shaft 24 will make .277 revolution, equal to a torque ratio of 3.6 : 1, which will be doubled approximately by the torque converter when the first turbine 12 is stalled.

B. Forward drive operation

Shifting the control lever into the "drive" position will bring about a release of pawl 41 from the teeth 40 of the carrier 18 and the application of brake band 44 to the brake drum 43. Clutch plate 37 remaining locked to the first turbine element 12 will drive the output shaft 24 at a speed of .56 revolution for one revolution of the turbine 12, equal to a ratio of 1.78 : 1, which will be doubled approximately by the torque converter, but the backward torque on internal gear 28 impressed thereon by the reaction torque of the second turbine element 13 will reduce the torque developed in the first planetary gear set.

For an engine torque of 100 units, therefore, the torque developed in the first planetary gear set for 200 units of torque on the first turbine 12 when stalled is then 1.78×200 or 356 units of torque. The reverse torque on the second turbine being 100 units will impress 70 units of reverse torque on internal gear 28, therefore, resulting in a net forward torque of 356 —70 or 286 units.

The rotation of the first turbine 12 will cause the second turbine 13 to rotate forwardly at a rate of .393 revolution for one revolution of the first turbine when the sun gears 21—22 are braked because both turbines are connected to components of the planetary gear sets.

As the speed of the first turbine 12 as well as that of the output shaft increases the negative torque felt by the second turbine diminishes to zero and thereafter a positive torque is imparted to the blades of the second turbine by the impinging oil.

This forward torque developed by the second turbine 13 is divided by the planetary pinions 20 and the larger portion of this torque is transmitted to internal gear 28 and is added to the output torque received by the carrier 25 from the internal gear 16. The smaller portion of said forward torque is imparted to sun gear 22, thereby reducing the reaction torque.

As the speed of the second turbine continues to increase and when it exceeds a value of .393 the reaction member 21—22 will begin to rotate forwardly and torque multiplication in the planetary gear sets ceases.

Finally, the speed of the second turbine will approach that of the first turbine and pump. The portion of the pump torque absorbed by the first turbine in approximately direct drive is about 28%, while the second turbine takes the remaining 72%.

The torque distribution in terms of 100 units of pump torque on the components of the interconnected planetary gear sets is tabulated below and in accordance with the stated gear data and when the speed ratio of the second turbine to the first turbine approximately equals unity:

FIRST GEAR SET

| | |
|---|---|
| Internal gear 16 | 27.8 |
| Compound planet pinions 45—46 | 49.5 |
| Sun gear 21 | −21.6 |

SECOND GEAR SET

| | |
|---|---|
| Internal gear 28 | 50.5 |
| Planet pinions 20 | 72.2 |
| Sun gear 22 | 21.6 |

C. *Reverse operation*

Shifting the control lever into the "reverse" position will engage pawl 41 with the teeth 40 on carrier 18, stalling the second turbine element 13. Brake band 44 will also be released from the brake drum 43, clutch plate 37 will also be released from the first turbine element 12, but clutch plate 36 will be locked thereto and drives sun gear 39.

The output shaft 24 will then make .288 reverse revolution for one forward revolution of the sun gear 39, equal to a torque ratio of 3.46:1, which will be doubled approximately by the torque converter when the first turbine is stalled.

Shifting the control lever into the "emergency" low position will release clutch plate 36 and engage clutch plate 37, pawl 41 remaining in engagement with the teeth 40 on carrier 18 and brake band 44 also remaining disengaged from the brake drum 43.

The vehicle in which the transmission just described is installed can be "rocked" in snow or mud by the mere shifting of the control lever from the "emergency" low position into the "reverse" position.

A rapid reversal of motion of the vehicle is thereby produced by this alternate engagement and disengagement of the clutch plates 36 and 37, and as the pawl 41 remains in engagement with the teeth 40 on carrier 18 during this "rocking" operation the control system of the transmission is simplified thereby.

Obvious modifications and rearrangement of the components of the transmission or minor improvements can be made by those skilled in the art, and changes in its mode of operation are also feasible. For example, the transmission may be operated from its lowest forward ratio into direct drive without the engagement of pawl 41 with the teeth 40 on carrier 18, because the overrunning brake "B" will take the torque reaction of the second turbine 13 or without the engagement of brake 44. When the speeds of the first and second turbines approach that of the pump the clutch plate 36 may be engaged, whereby the entire gear set becomes "locked-up."

It should be further understood that the gear proportions illustrated in the specification may be altered greatly to accommodate various operating conditions, and such modifications and changes shall come within the scope of the following claims.

I claim:

1. A variable speed and torque power transmission comprising in combination, a transmission casing, co-axial drive and driven shafts, first and second interconnected planetary gear sets, each having an input, an output and a reaction member, a hydro-dynamic torque device comprising a pump, first and second turbines and a stator, said pump being connected to said drive shaft, said first turbine having clutch coupling means thereon, said second turbine being connected to the input member of said second planetary gear set, said member having one-way brake means thereon in cooperating relation with said transmission casing, the stator of said hydro-dynamic device being positioned between said second turbine and said pump and having one-way brake means thereon in cooperating relation with said transmission casing, the output member of second gear set being connected to the output member of said first planetary gear set and to said driven shaft, the input member of said first gear set having clutch coupling means cooperating with the clutch coupling means of said first turbine, the reaction members of both said gear sets being joined and having one-way brake means thereon, movable brake means in cooperating relation with the one-way brake means on said reaction members, and stationary brake means for selective cooperation with said movable brake means, the arrangement of the components being such that when said clutch coupling means and said stationary brake means are in their engaged condition the driven shaft will receive an initially high starting torque drive and thereafter with a continuously diminishing and balanced torque will attain a direct ratio drive.

2. A variable speed and torque power transmission according to claim 1, having one-way brake means on the driven shaft and in cooperating relation with said movable brake means, to prevent reverse rotation of said driven shaft when said stationary brake means is applied to said movable brake means.

3. A variable speed and torque power transmission comprising in combination, a transmission casing, co-axial drive and driven shafts, first and second interconnected planetary gear sets, each having an input member, an output and a reaction member, a hydro-dynamic device comprising a pump, first and second turbines and a stator, said pump being connected to said drive shaft, said first turbine having hydraulically actuated clutch coupling means thereon, said second turbine being connected to the input member of said second planetary gear set, said member having one-way brake means thereon in cooperating relation with said transmission casing, the stator of said hydro-dynamic device being positioned between said second turbine and said pump and having one-way brake means thereon in cooperating relation with said transmission casing, the output member of said second gear set being connected to the output member of said first planetary gear set and to said driven shaft, the input member of said first gear set having clutch coupling means cooperating with the clutch coupling means of said first turbine, the reaction members of both said gear sets being joined and having one-way brake means thereon, movable brake means in cooperating relation with the one-way brake means on said reaction members, and stationary brake means for selective cooperation with said movable brake means, the arrangement of the components being such that when said clutch coupling means and said stationary brake means are in their engaged condition the driven shaft will receive an initially high starting torque, and when said stationary brake means is released from said movable brake means a still higher starting torque will be imparted to said driven shaft.

4. A variable speed and torque power transmission comprising in combination, a transmission casing, co-axial drive and driven shafts, first and second interconnected planetary gear sets, each having an input member, an output member and a reaction member, a hydro-dynamic torque device comprising a pump, first and second turbines and a stator, said pump being connected to said drive shaft, said first turbine having hydraulically actuated clutch coupling means thereon, said second turbine being connected to the input member of said second planetary gear set, said member having one-way brake means thereon in cooperating relation with said transmission casing, the stator of said hydro-dynamic device being positioned between said second turbine and said pump and having one-way brake means thereon in cooperating relation with said transmission casing, the output member of said second gear set being connected to the output member of the first gear set and to said driven shaft, the input member of said first gear set having clutch coupling means cooperating with the clutch coupling means of said first turbine, the reaction members of both said gear sets being joined and having one-way brake means thereon, movable brake means in cooperating relation with the one-way brake means on said reaction members, stationary brake means for selective cooperation with said movable brake means, and toothed brake means on the input member of said second gear set, a movable pawl operatively mounted in said transmission casing and in cooperating relation with said toothed brake means, and when said pawl is engaged therewith and said stationary brake means is released from said movable brake means the driven shaft will receive a high starting torque and will operate in an underdrive ratio.

5. A variable speed and torque power transmission comprising in combination, a transmission casing, co-axial drive and driven shafts, two interconnected planetary gear sets, each having an internal gear, a sun gear and a planet pinion carrier whose pinions mesh with said internal and sun gears, a hydro-dynamic device comprising a pump, first and second turbines and a stator, said pump being connected to said drive shaft, said first turbine having hydraulically actuated clutch coupling means thereon, said second turbine being connected to the carrier of said second planetary gear set, said carrier having one-way brake means thereon in cooperating relation with said transmission casing, the stator of said hydro-dynamic device being positioned between said second turbine and said pump and having one-way brake means thereon in cooperating relation with said transmission casing, the internal gear of said second gear set being connected to the planet pinion carrier of the first gear set and to said driven shaft, the internal gear of said first gear set having clutch coupling means cooperating with the clutch coupling means of said first turbine, the sun gears of both gear sets being joined and having one-way brake means thereon, movable brake means in cooperating relation with the one-way brake means on said sun gears, stationary brake means for selective cooperation with said movable brake means, and when said clutch coupling means are engaged and said stationary brake means are disengaged from said movable brake means the driven shaft will receive a high starting torque and will operate in a forward underdrive ratio.

6. A variable speed and torque power transmission according to claim 5, having a second brake means on the carrier of said second gear set.

7. A variable speed and torque power transmission according to claim 6, in which said second brake means comprises a toothed brake means on said carrier and a movable pawl operatively mounted in said transmission casing.

8. A variable speed and torque power transmission according to claim 7, and having hydraulic means for actuating said movable pawl in and out of engagement with said toothed brake means.

9. A variable speed and torque power transmission comprising in combination, a transmission casing, co-axial drive and driven shafts, first and second interconnected planetary gear sets, each having a planet pinion carrier and a sun reaction gear, compound planetary pinions rotatably mounted on the carrier of said first gear set, said first gear set having an input internal gear and an input sun gear in mesh with one section of said compound planet pinions, the other section thereof being in mesh with the sun reaction gear of said first gear set, said second gear set having an output internal gear, simple planet pinions rotatably mounted on the carrier of said second gear set and respectively meshing with said output internal gear and the sun reaction gear of said second gear set, a hydraulic torque converter comprising a pump, first and second turbines and a stator, said pump being connected to said drive shaft, said first turbine having two clutch coupling means thereon, said second turbine being connected to the carrier of said second gear set, said carrier having one-way brake means thereon in cooperating relation with said transmission casing, the stator of said hydraulic torque converter being positioned between said second turbine and said pump and having one-way brake means thereon in cooperating relation with said transmission casing, said output internal gear of said second gear set being connected to the planet pinion carrier of said first gear set and said driven shaft, said input internal gear and said input sun gear of said first gear set each having clutch coupling means cooperating with their respective clutch coupling means on said first turbine, the sun reaction gears of both gear sets being joined and having one-way brake means thereon, movable brake means in cooperating relation with the one-way brake means on said sun reaction gears, stationary brake means for selective cooperation with said movable brake means, a second brake means on the carrier of said second gear set, and when said second brake means is applied to said carrier and the clutch means of the input internal gear is coupled with the clutch means of said first turbine the driven shaft will receive a high starting torque and turn in the forward direction, and upon release of the clutch means of said input internal gear and the engagement of the clutch means on said input sun gear with the clutch means of said first turbine, the driven shaft will receive a high starting torque and turn in the reverse direction.

10. A variable speed and torque power transmission according to claim 9, said second brake means comprising a toothed brake means on said carrier and a movable pawl operatively mounted in said transmission casing.

11. A variable speed and torque power transmission according to claim 10, and having hydraulic means for actuating said movable pawl in and out of engagement with said toothed brake means.

12. A variable speed and torque power transmission according to claim 9, in which the two clutch coupling means on said first turbine are hydraulically actuated.

13. A variable speed and torque power transmission according to claim 9, said driven shaft having one-way brake means in cooperating relation with the movable brake means, whereby reverse rotation of said driven shaft is prevented when said stationary brake means is engaged with said movable brake means.

14. A compound torque multiplying mechanism for transmitting uninterrupted torque comprising in combination, a transmission casing, a drive shaft and a driven shaft, two interconnected planetary gear sets, the first gear set thereof having two input members, a reaction member and an output planet pinion carrier with rotatably mounted compound pinions thereon, one section of said pinions being in mesh with both said input members, the other section of said pinions being in mesh with said reaction member, the second gear set having a reaction member, an output member and an input planet pinion carrier with rotatably mounted simple pinions thereon and in mesh with said reaction and said output members of said second gear set, said reaction members of both gear sets being joined and having one-way brake means thereon, a movable brake in cooperating relation with the one-way brake means of said reaction members, stationary brake means for selective cooperation with said movable brake, one-way brake means and two-way brake means on the carrier of said second gear set, said several brake means being in cooperative relation with said transmission casing, a hydraulic torque converter comprising a pump, first and second turbines and a stator, one-way brake means on said stator, said pump being connected to said drive shaft, said first turbine having two clutch coupling means thereon, said second turbine being connected to the carrier of said second gear set, the stator of said torque converter being positioned between said second turbine and said pump, and the output member of said second gear set and the carrier of said first gear set being connected to said driven shaft, both of said input members of said first gear set having clutch coupling means for cooperation with the clutch coupling means on said first turbine, means to energize said clutch coupling means, means to energize said brake means, whereby the driven shaft will receive: (1) a high forward drive torque when the clutch coupling means of said first turbine and said one input member of said first gear set are engaged; and (2) an intermediate and continuously decreasing forward drive torque; (3) with an increase in speed the resultant torque balance in the converter and planetary gearing will bring about a direct drive ratio when said stationary brake means is engaged with said movable brake; and (4) relative gear motion will cease when the other input member of said first gear set is coupled with the clutch means on said first turbine; (5) a high reverse drive torque when said two-way brake means and the clutch coupling means of said first turbine and said other input member of said first gear set are engaged.

15. A compound torque multiplying mechanism for transmitting uninterrupted torque according to claim 14, said driven shaft having one-way brake means thereon and in cooperating relation with said movable brake.

References Cited in the file of this patent

UNITED STATES PATENTS

| | | |
|---|---|---|
| 2,368,873 | Pollard | Feb. 6, 1945 |
| 2,602,353 | Keller | July 8, 1952 |

FOREIGN PATENTS

| | | |
|---|---|---|
| 151,415 | Australia | May 13, 1953 |